Patented Oct. 8, 1940

2,216,889

UNITED STATES PATENT OFFICE 2,216,889

PIGMENT MATERIAL AND PROCESS OF MAKING THE SAME

Ray L. McCleary, Richardson Park, Del., assignor to E. I. du Pont de Nemours & Company, Wilmington, Del., a corporation of Delaware No Drawing. Application March 16, 1939, Serial No. 262,185

13 Claims. (Cl. 134—58)

This invention relates to the art of white pigment materials. More particularly it relates to the art of white pigment extenders. Still more particularly it relates to an improved calcium carbonate extender material and a process for producing the same.

It is well known in the pigment art that prime white pigments, i. e., such pigment materials as titanium dioxide, zinc sulfide, zinc oxide, and the like, having indices of refraction of more than about 2, are usually mixed with white extender materials, such as barium sulfate, calcium sulfate, magnesium silicate, calcium carbonate, and the like, having indices of refraction of less than about 1.7, when employed in white coating compositions such as enamel paints, flat paints, and the like. Such extender materials not only are employed as diluents to lower the cost of said coating compositions but when employed as diluents in this manner they markedly increase the efficiency and hiding power of the high strength pigment and, moreover, impart highly desirable properties to the films of said coating compositions.

On account of its low price, high bulking value, and many other desirable characteristics, calcium carbonate has long been recognized as a white extender material well adapted for employment with the aforementioned high strength pigment materials in many of said coating composition formulations. However, I have found that the aforementioned calcium carbonate extenders have poor leveling characteristics, particularly in enamel type paint formulations, i. e., calcium carbonate comprising formulations, when brushed out on surfaces such as those of wood, metal, plaster, etc., do not level out to provide a smooth level film, and even after drying still show the brush marks to an extremely undesirable extent.

This invention has as an object the provision of a calcium carbonate which has greatly improved properties for use as a prime pigment extender in paint formulations, especially in the enamel type. A further object is the production of a calcium carbonate extender material which may be employed in enamel type paint formulations to provide films having excellent leveling properties, gloss, and color. A still further object is the production from naturally occurring calcium carbonate of calcium carbonate having high strength, relatively low oil absorption, and excellent fineness. Additional objects will become apparent from an examination of the following description and claims.

These and other objects and advantages are accomplished by the following invention which broadly comprises milling calcium carbonate in the presence of a polyglycolide. By the term "polyglycolide" as used herein and in the appended claims I mean condensed glycollic acid or an alkali metal salt thereof, said alkali metal salt being a product obtained by the reaction of condensed glycollic acid with an alkaline reacting alkali metal salt. The term "alkali metal" includes sodium, potassium, rubidium, cesium, the ammonium ($NH_4$) radical, and the like.

In a more restricted sense this invention comprises heating glycollic acid at a temperature in the range of from about 100° C. to about 200° C. until evolution of water ceases, allowing the condensed glycollic acid thereby produced to cool and solidify, pulverizing the hard, brittle, white solid thereby obtained, and wet milling calcium carbonate in the presence of from about 0.1 to about 5%, on the basis of the calcium carbonate, of said pulverized condensed glycollic acid.

The preferred embodiment of this invention comprises heating glycollic acid with stirring in an open vessel at a temperature between about 135° C. and about 180° C. for about 1½ hrs., cooling and crushing the condensed glycollic acid thereby obtained, adding from about 0.5% to about 1.5%, on the basis of the calcium carbonate, of said crushed condensed glycollic acid, to naturally occurring calcium carbonate which has been substantially freed of iron compounds and wet milling the resultant mixture, dewatering the calcium carbonate suspension thereby produced, and thereafter drying and dry milling the calcium carbonate product to break up lumps formed on drying.

For a better understanding of the characteristics of the calcium carbonate of this invention, it will be necessary to explain the various terms used herein and the methods of testing employed.

Oil absorption

Oil absorption is the amount of oil in grams required to wet 100 grams of pigment. The method of testing is described on pages 540–541 of the 8th (January 1937) edition of "Physical and Chemical Examination of Paints, Varnishes, Lacquers and Colors," by Henry A. Gardner.

A 5 gram sample is used. Acid refined linseed oil of acid number 12.5 is added slowly from a burette and worked into the pigment with a spatula on a smooth glass plate. The addition of oil is continued a drop or two at a time until the pigment can be collected in one coherent mass adhering to the spatula but not wetting the glass. The amount of oil used to wet the pigment is read from the burette.

Tinting strength

Tinting strength is the measure of the effectiveness of a white pigment in covering up the tint of a colored pigment mixed with it, and is also a measure of the hiding power of a pigment in an enamel type paint formulation. The property is relative in nature and results are obtained in comparison with another pigment used as a standard. These results depend on the standard for magnitude but are independent of the standard for relative order.

Pastes are prepared by mulling together the white pigment, ultramarine blue, and acid refined linseed oil of 12.5 acid number for 3 minutes with a 15 pound weighted muller. In all cases 3.0 grams of white pigment are mulled with 0.3 gram of ultramarine blue. The amount of oil used depends upon the oil absorption of the white pigment under test. Pigments having oil absorptions of more than 12 but less than 16 require the employment of 1.1 cc. of oil in this test; pigments having oil absorptions in the range of from 16 to 22 require 1.2 cc. of oil; while those having oil absorptions of more than 22 but less than 28 must be mulled with 1.3 cc. of oil.

Standards are prepared in the same manner except for the amount of blue which is increased or decreased proportionately as it is desired to prepare standards of lower or higher strengths. The standard pigment employed in testing the herein described blended pigments comprising 30% by weight pigment titanium dioxide and 70% calcium carbonate extender, was a standard titanium dioxide-calcium sulfate pigment having a tinting strength of 195 and comprising 30% by weight pigment titanium dioxide and 70% anhydrite.

The sample paste is graded through a glass microscope slide between standards of higher and lower strengths (i. e. less or more deeply tinted), and not more than 5% apart in strength. The proportion of blue used in the standard paste to give any desired strength is inversely proportional to that strength. Thus, one standard is called arbitrarily 195 which corresponds to 0.3 gram of blue in the paste. The blue required to give 170 strength is $$\frac{195}{170} \times 0.3$$

The above method is similar to that described by J. E. Booge and H. E. Eastlack in "Paint, Oil and Chemical Review," April 16, 1924.

Color

Color is the apparent brightness and tint of the pigment in an oil paste as measured relative to a standard similarly prepared, and is expressed in units on an arbitrary scale.

The pastes are prepared by mulling the pigment with acid refined linseed oil of acid number 12.5 to form a thick paste. The sample to be tested and the standard are placed beside each other on a colorless microscope slide 2"×3" in daubs about 1½"×1". The daubs should be in sharp contact without air bubbles in the contact line and should be sufficiently thick to cut off all transmitted light. The pastes are then graded under North sky light for differences in appearance. The minimum perceptible difference in brightness is called one point of color.

The sample is graded in full points from the standard. Differences in tint are important. In the case of white pigment, a yellowish cast of the sample is penalized in the grading to the extent of 1 or more points as it is barely perceptible or clearly evident. On the other hand, a bluish cast relative to the standard is desirable and consequently modifies the brightness grading upward. This procedure is essentially the one described by J. E. Booge and H. E. Eastlack in "Paint, Oil and Chemical Review," April 9, 1924.

Pigments suitable for use in high quality white paints should have a color grading of 12 or higher on the arbitrary scale of the above color test.

Gloss

Gloss is the ability of a surface to reflect light regularly. It is determined on the Lange Photo-Electric Gloss Meter by the method described on pages 247–248 of the Dr. St. John's translation of Dr. Lange's "Photo-Elements and Their Application" published in 1938 by Reinhold Publishing Corporation, the deflection of the needle of said gloss meter being adjusted to read 100 for a standard sample of polished black glass.

Having explained the terms used herein I can now proceed with a detailed description of my invention.

Various arrangements and selections of equipment for the operation of my novel process are possible. In the preferred arrangement, however, I crush in a jaw crusher a calcite ore comprising not less than about 98% calcium carbonate and having iron disulfide as its principal impurity, and disintegrate the crushed ore in a rotary hammer mill under such conditions as to provide a coarse powder whose particles have diameters in the range of about 0.1 to 0.6, and preferably in the range of about 0.25 to about 0.45. Said powder is heated to a temperature between about 425° C. to about 550° C., and preferably between about 500° C. and about 550° C. and maintained at said temperature for a period between about 1 to about 20, and preferably between about 5 to about 15 minutes, said heating being effected in an internally fired continuous rotating calciner in an oxidizing atmosphere comprising a large excess of air. The heated powder is cooled and subjected to a magnetic separation operation, as in a Wetherill magnetic separator, whereupon substantially all of the impurities present as iron disulfide in the original ore are separated from the calcium carbonate. (This process for producing calcium carbonate substantially free from iron disulfide is claimed in co-pending application Serial Number 262,184 filed March 16, 1939.) 1% by weight of condensed glycollic acid, prepared in the manner hereinbelow described, is added to the calcium carbonate and the mixture thereby produced is wet milled, such as in a ball mill, to provide a calcium carbonate of pigment fineness which is subsequently dewatered, dried, and disintegrated, such as in a rotary hammer mill, to break up lumps formed on drying. The aforementioned condensed glycollic acid is prepared by heating glycollic acid, preferably with stirring, at a temperature in the range of from about 135° C. to about 180° C. in an open vessel until evolution of water ceases. In most instances said reaction is completed when the glycollic acid is maintained at a temperature in the aforementioned range for from about 1 to about 2 hours. The melted condensed glycollic acid thereby produced is allowed to cool and solidify and is then pulverized in any convenient manner to provide a powder whose particles have diameters of not more than about 0.5 millimeter.

The following examples are given for illustrative purposes and are not intended to place any restrictions or limitations on the herein described invention:

Example I

A sample of calcite rock comprising 98.4% calcium carbonate and 0.4% pyrites by weight was crushed in a jaw crusher and disintegrated in a rotary crusher to provide a coarse powder of which substantially all of the particles had diameters in the range of from 0.15 to 0.4 millimeter. 5 pounds of said powder was heated, exposed to atmospheric air, to a temperature of 520° C. in an externally electrically heated rotating calciner and maintained at that temperature for a period of 5 minutes, after which the heated powder was removed from said calciner and allowed to cool. The powder at room temperature was passed slowly through a laboratory size Ferrofilter, whereupon the iron impurity present as pyrites in the calcite rock was removed and a relatively pure calcium carbonate powder was obtained. A 600 gram sample of the resultant calcium carbonate was mixed with 6 grams of condensed glycollic acid, prepared as hereinafter explained, and the mixture was wet milled for 20 hours in a 1 gallon pebble mill containing 3000 grams porcelain pebbles and 600 grams water and revolving at the rate of 60 revolutions per minute. The aqueous calcium carbonate suspension produced, which comprised substantially no particles having diameters of more than 6 microns, was dewatered, dried at a temperature of 125° C., and disintegrated by passage through a squirrel cage disintegrator to provide a calcium carbonate extender eminently suitable for use in high quality enamel type paint formulations, which was designated as sample A. A second 600 gram sample of the aforementioned purified calcium carbonate was wet milled in exactly the same manner as the hereinbefore described novel calcium carbonate product of this invention, except that no glycollic acid was added thereto. The sample obtained was designated as sample B. In the following table are listed the strength, oil absorption, and color of blended pigments comprising 30% by weight of a pigment titanium dioxide and 70% respectively of the aforementioned calcium carbonate samples A and B. Also recorded are the gloss readings and the leveling properties of films of a representative titanium dioxide-calcium carbonate enamel type paint formulation comprising said sample A and B.

Table I

| Sample | Oil absorption | Strength | Color | Enamel gloss | Paint film leveling |
| --- | --- | --- | --- | --- | --- |
| A | 14 | 204 | 13+ | 94 | Excellent. |
| B | 14 | 203 | 14 | 90 | Poor. |

It will be noted that my novel process provided a calcium carbonate extender definitely superior in leveling properties and gloss characteristics, and substantially equal in oil absorption, strength, and color to the comparable untreated prior art calcium carbonate extenders.

The aforementioned condensed glycollic acid was prepared by heating glycollic acid. 454 grams of white crystalline glycollic acid was heated rapidly to 135° C. with stirring in a three necked flask equipped with a thermometer, stirrer, and downward condenser. Stirring was continued and the temperature of the glycollic acid was raised slowly to 180° C. during a time interval of 1½ hours. At the end of said heating period evolution of water had ceased and condensation of the glycollic acid had been effected. The molten condensed glycollic acid thereby produced was removed from the flask, cooled to room temperature to provide a hard, brittle, white solid which was then crushed to form a white powder whose particles had diameters of less than about 0.5 millimeter.

Example II

A 600 gram sample of good quality crushed limestone was mixed with 6 grams of the condensed glycollic acid described in the aforementioned Example I, and the mixture was wet milled for 20 hours in a 1 gallon pebble mill containing 3000 grams porcelain pebbles and 600 grams water and revolving at the rate of 60 revolutions per minute. The aqueous calcium carbonate suspension produced, which comprised substantially no particles having diameters of more than 8 microns, was dewatered, dried at a temperature of 125° C., and disintegrated by passage through a squirrel cage disintegrator to provide a calcium carbonate sample which was designated as sample A. A second portion of the aforementioned crushed limestone was wet milled in exactly the same manner as the hereinabove described novel product of my invention except that addition thereto of the condensed glycollic acid was omitted. The calcium carbonate powder produced was designated as sample B. In the following table are listed the strength, oil absorption, and color of blended pigments comprising 30% by weight of a pigment titanium dioxide and 70% respectively of the aforementioned calcium carbonate samples A and B. Also recorded are the gloss readings and leveling characteristics of films of a representative titanium dioxide-calcium carbonate enamel type paint formulation comprising said calcium carbonate samples A and B.

Table II

| Sample | Oil absorption | Strength | Color | Enamel gloss | Paint film leveling |
| --- | --- | --- | --- | --- | --- |
| A | 15 | 199 | 8+ | 85 | Excellent. |
| B | 15 | 198 | 9 | 83 | Poor. |

It will be noted that my novel process provided a calcium carbonate extender which was definitely better in leveling properties, somewhat superior in gloss characteristics, and substantially equal in oil absorption, strength, and color to the prior art calcium carbonate extender sample B.

It is to be understood that the hereinbefore disclosed specific embodiments of my invention may be subjected to variation and modification without departing from the scope of this invention. For instance, while I prefer to employ naturally occurring calcium carbonate which has been substantially freed from iron disulfide as hereinbefore described, it is to be understood that my process is applicable to all types of calcium carbonate, such as other calcium carbonate ores and precipitated calcium carbonate, used in coating compositions.

The glycollic acid employed in my process is the well-known white crystalline glycollic acid of commerce. Condensation of said glycollic acid may be effected in a variety of ways. However, the heating required to effect said condensation must be done under such conditions that the water evolved during said condensation may have an opportunity to escape from the reaction mixture. Furthermore, it is desired that the mixture should be stirred during said condensation operation. Appreciable effects are obtained when the condensation proceeds at temperatures of as low as about 100° C. Increased effects are obtained when said condensation is effected at temperatures of as high as about 200° C. For most ordinary purposes, however, I prefer to effect said condensation at temperatures in the range of from about 135° C. to about 180° C. Said heating should be continued until evolution of water ceases and, in most instances, this may be effected by heating in the aforementioned temperature range of from about 100° C. to about 200° C. for a period of from about 30 minutes to about 5 hours.

On account of convenience in handling, it is preferred that the solidified, condensed glycollic acid should be pulverized before it is mixed with calcium carbonate. Said pulverizing may be effected in any of the suitable milling devices well known in the art; in most instances said condensed glycollic acid is milled to a fineness of about 0.5 millimeter or less.

The optimum amount of polyglycolide employed in my process can best be learned by experimental trial, and will depend upon the physical and chemical characteristics of the calcium carbonate being milled, and the use requirements of the finished calcium carbonate extender material. Appreciable effects are obtained when as little as about 0.1%, on the basis of the calcium carbonate weight, is employed. Increased effects are obtained when as much as about 5% is used. Employment of more than about 5% in certain instances produces a deleterious effect on the leveling properties of the calcium carbonate extender. I have found that optimum results are obtained when an amount in the range of from about 0.25% to about 2%, and preferably from about 0.5% to about 1.5%, on the basis of the calcium carbonate weight, is employed.

The optimum amount of wet milling to which the mixture of calcium carbonate and polyglycolide is subjected can best be learned by experimental trial and will depend upon the type and previous history of the calcium carbonate and the use requirements of the finished calcium carbonate extender material. Thus, if the aforesaid mixture is to be used in enamel paints, I have found it desirable that substantially all the particles should have diameters of less than about 8 microns, and preferably less than about 6 microns. However, when used in other paint formulations, such as in flat paints, I have found it unnecessary to subject it to such severe grinding. Thus, in flat paints exceptionally good results have been obtained by having substantially all of the particles less than about 15 microns in diameter. Said wet milling may be effected in any of the wet milling devices well known to the art, such as pebble mills, colloid mills, and the like.

My process possesses advantages not previously combined in a single process. Furthermore, the products of my process possess advantages not previously combined in a white pigment extender material. For instance, the products of my hereinbefore described novel process, when employed as prime pigment extenders in paint formulations, especially in the enamel type, provide coating compositions which on being brushed out on surfaces such as those of metal, wood, and the like, level out rapidly and on drying show no visible brush marks. On the other hand, corresponding untreated calcium carbonate extender materials when employed in said formulations provide compositions which when brushed out on the aforementioned surfaces level out very slowly so that by the time the film is dry the marks of the brush used to apply said coating composition are still evident to a very marked and undesirable extent. Furthermore, the calcium carbonate products of my novel process when used in paint formulations provide films having better gloss characteristics than do comparable pigment extenders not treated with condensed glycollic acid. In addition, treatment of calcium carbonate extender materials in the aforementioned manner with condensed glycollic acid, has little, if any, effect upon the oil absorption, strength, or color characteristics of said calcium carbonate materials.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. In a process for producing an improved extender material the step which comprises wet milling a mixture of calcium carbonate and a polyglycolide.

2. In a process for producing an improved extender material the step which comprises wet milling a mixture of calcium carbonate and condensed glycollic acid.

3. In a process for producing an improved extender material the step which comprises wet milling a mixture of calcium carbonate and between about 0.1% and about 5%, on the basis of the calcium carbonate, of condensed glycollic acid.

4. A process for producing an improved extender material which comprises adding to calcium carbonate in the form of a coarse powder between about 0.1% and about 5%, on the basis of the calcium carbonate, of condensed glycollic acid, wet-milling the mixture, and thereafter dewatering, drying, and disintegrating the resultant material.

5. A process for producing an improved extender material which comprises adding to powdered calcium carbonate, between about 0.1% and about 5%, on the basis of the calcium carbonate, of condensed glycollic acid, wet-milling the mixture until substantially all the material has a particle size not greater than about 15 microns in diameter, thereafter dewatering, drying, and disintegrating the resultant material.

6. A process for producing an improved extender material which comprises adding to powdered calcite ore substantially free of iron compounds and containing at least 98% of calcium carbonate between about 0.1% and about 5%, on the basis of the calcium carbonate, of condensed glycollic acid in a pulverized form, wet-milling the mixture, and thereafter dewatering, drying, and disintegrating the resultant material.

7. A process for producing an improved extender material which comprises adding to powdered calcite ore substantially free of iron compounds and containing at least about 98% of calcium carbonate between about 0.5% and about 1.5%, on the basis of the calcium carbonate, of condensed glycollic acid, wet-milling, and thereafter dewatering, drying, and disintegrating the resultant material.

8. An improved wet-milled extender material which comprises calcium carbonate and a polyglycolide.

9. An improved wet-milled extender material which comprises calcium carbonate and condensed glycollic acid.

10. An improved wet-milled extender material which comprises calcium carbonate and between about 0.1% and about 5%, on the basis of the calcium carbonate, of condensed glycollic acid.

11. In a process for producing an improved extender material the step which comprises wet milling a mixture of calcium carbonate and between about 0.1% and about 5%, on the basis of the calcium carbonate, of a polyglycolide.

12. An improved wet-milled extender material which comprises calcium carbonate and between about 0.1% and about 5%, on the basis of the calcium carbonate, of a polyglycolide.

13. An improved wet-milled extender material which comprises calcium carbonate and between about 0.5% and about 1.5%, on the basis of the calcium carbonate, of condensed glycollic acid.

RAY L. McCLEARY.